United States Patent
Vishnoi et al.

(10) Patent No.: US 8,713,046 B2
(45) Date of Patent: Apr. 29, 2014

(54) SNAPSHOT ISOLATION SUPPORT FOR DISTRIBUTED QUERY PROCESSING IN A SHARED DISK DATABASE CLUSTER

(75) Inventors: Surendra Kumar Vishnoi, Jodhpur Rajasthan (IN); Colin Florendo, Marlborough, MA (US)

(73) Assignee: Sybase, Inc., Dublin, CA (US)

( * ) Notice: Subject to any disclaimer, the term of this patent is extended or adjusted under 35 U.S.C. 154(b) by 142 days.

(21) Appl. No.: 13/309,603

(22) Filed: Dec. 2, 2011

(65) Prior Publication Data
US 2013/0117307 A1    May 9, 2013

Related U.S. Application Data

(60) Provisional application No. 61/556,899, filed on Nov. 8, 2011.

(51) Int. Cl.
*G06F 17/30* (2006.01)
(52) U.S. Cl.
USPC ............................ 707/770; 707/649; 707/764
(58) Field of Classification Search
USPC .......................................... 707/770, 649, 764
See application file for complete search history.

(56) References Cited

U.S. PATENT DOCUMENTS

| | | | | |
|---|---|---|---|---|
| 5,357,631 | A * | 10/1994 | Howell et al. | 1/1 |
| 7,788,243 | B2 * | 8/2010 | Pasupuleti et al. | 707/704 |
| 8,566,326 | B2 * | 10/2013 | Hu et al. | 707/745 |
| 2008/0065644 | A1 * | 3/2008 | Pasupuleti et al. | 707/10 |
| 2010/0211554 | A1 * | 8/2010 | Reid et al. | 707/703 |
| 2011/0010330 | A1 * | 1/2011 | McCline et al. | 707/602 |
| 2011/0153566 | A1 * | 6/2011 | Larson et al. | 707/638 |
| 2011/0246503 | A1 * | 10/2011 | Bender et al. | 707/769 |
| 2012/0011106 | A1 * | 1/2012 | Reid et al. | 707/695 |
| 2012/0124095 | A1 * | 5/2012 | Kellermann et al. | 707/792 |
| 2012/0136839 | A1 * | 5/2012 | Eberlein et al. | 707/690 |
| 2012/0151495 | A1 * | 6/2012 | Burckhardt et al. | 718/106 |
| 2012/0254253 | A1 * | 10/2012 | Kuszmaul et al. | 707/797 |
| 2013/0103659 | A1 * | 4/2013 | Larson et al. | 707/703 |

* cited by examiner

*Primary Examiner* — Thanh-Ha Dang
(74) *Attorney, Agent, or Firm* — Sterne, Kessler, Goldstein, Fox, P.L.L.C.

(57) ABSTRACT

System, method, computer program product embodiments and combinations and sub-combinations thereof for snapshot isolation support for distributed query processing in a shared disk database cluster are provided. The embodiments include the forming of object identification data in a leader node of query execution in the shared disk database cluster. At least one fragment of the query execution is distributed to at least one worker node in the shared disk database cluster, and the object identification data is utilized for multiversion concurrency control during query execution by the leader node and at least one worker node.

17 Claims, 5 Drawing Sheets

SNAPSHOT ISOLATION SUPPORT FOR DISTRIBUTED QUERY PROCESSING IN A SHARED DISK DATABASE CLUSTER

CROSS-REFERENCE TO RELATED APPLICATIONS

The present applications claims the benefit of U.S. provisional application No. 61/556,899, filed on Nov. 8, 2011, entitled "Snapshot isolation Support For Distributed Query Processing In A Shared Disk Database Cluster", which is incorporated herein by reference in its entirety.

BACKGROUND

1. Field of the Invention

The present invention relates to information processing environments and, more particularly, snapshot isolation support for distributed query processing in a shared disk database cluster.

2. Background Art

Computers are very powerful tools for storing and providing access to vast amounts of information. Computer databases are a common mechanism for storing information on computer systems while providing easy data access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about underlying hardware-level details. Typically, all requests from users for access to the data are processed by the DBMS. For example, information may be added or removed from data files, information retrieved from or updated in such files, and so forth, all without user knowledge of the underlying system implementation. In this manner, the DBMS provides users with a conceptual view of the database that is removed from the hardware level.

In recent years, users have demanded that database systems be continuously available, with no downtime, as they are frequently running applications that are critical to business operations. In response, distributed database systems have been introduced. Architectures for building multi-processor, high performance transactional database systems include a Shared Disk Cluster (SDC), in which multiple computer systems, each with a private memory share a common collection of disks. Each computer system in a SDC is also referred to as a node, and all nodes in the cluster communicate with each other, typically through private interconnects.

In general, SDC database systems provide for transparent, continuous availability of the applications running on the cluster with instantaneous failover amongst servers. More and more, mission-critical systems, which store information on database systems, such as data warehousing systems, are run from such clusters. Data warehouse systems represent a type of database system optimized as a decision support system by tracking and processing large amounts of aggregate database information, i.e., the data warehouse. Data warehouses contain a wide variety of data that could be used to present a coherent picture of business conditions at a single point in time. Products exist for building, managing, and using a data warehouse, such as Sybase IQ available from Sybase, Inc. of Dublin, Calif.

Although SDC database systems provide increased availability and reliability in such environments, they also introduce a number of new challenges. Among these challenges is achieving snapshot isolation.

In databases, and transaction processing (transaction management), snapshot isolation is a guarantee that all reads made in a transaction will see a consistent snapshot of the database (in practice, the last committed values that existed at the time the transaction started are read), and the transaction itself will successfully commit only if no updates made by it conflict with any concurrent updates made since that snapshot. Snapshot isolation does not provide strict serialization but allows queries and updates to run with greater concurrency. In snapshot isolation, queries do not block for updates and vice-versa. Database systems with heavy query workload (e.g., data warehouses) greatly from this property.

Database systems have been known to use multi-version concurrency control (MVCC) to achieve snapshot isolation. However, extending MVCC to support snapshot isolation in shared disk database clusters poses unique challenges. Normally, if users want snapshot isolation in an SDC, only non-distributed operations (including queries) are allowed. A possible approach to support snapshot isolation in an SDC would be to localize a transaction to the originating node in the cluster. This would require trivial changes to succeed in the cluster environment, as it would be akin to operations of a single node database. However, this fails to support transactions involving queries or updates which need to be executed in part on more than one node in the SDC.

Accordingly, a need exists for an approach to support snapshot isolation in SDC When queries are executed in a distributed manner. The present invention addresses these and other needs.

BRIEF SUMMARY

Briefly stated, the invention includes system, method, computer program product embodiments and combinations and sub-combinations thereof for snapshot isolation support for distributed query processing in a shared disk database cluster. Included in the invention is the forming of object identification data in a leader node of query execution in the shared disk database cluster. At least one fragment of the query execution is distributed to at least one worker node in the shared disk database cluster, and the object identification data is utilized for multiversion concurrency control during query execution by the leader node and at least one worker node.

Further embodiments, features, and advantages of the invention, as well as the structure and operation of the various embodiments of the invention, are described in detail below with reference to accompanying drawings.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION

The present invention relates to a system, method, computer program product embodiments and combinations and sub-combinations thereof for snapshot isolation support for distributed query processing in a shared disk database cluster.

Figure 1:
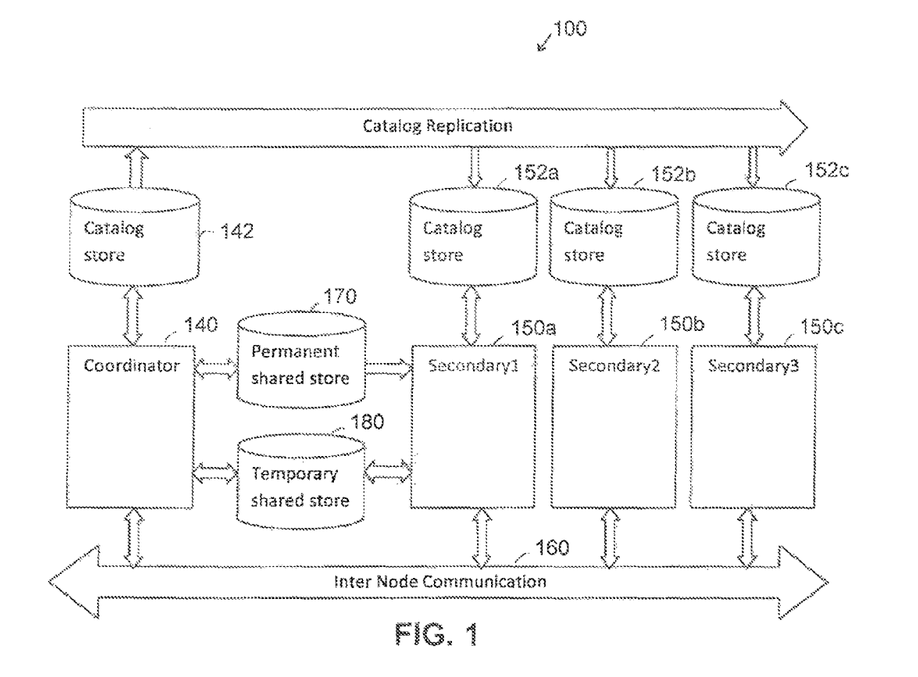
FIG. 1 illustrates an example of a clustered server configuration.

FIG. 1 illustrates an example 100 of a shared disk database cluster, which, in general, handles concurrent data loads and queries from users/applications via independent data processing nodes connected to shared data storage. In operation, shared database objects can be written by one user and queried by multiple users simultaneously. Many objects of this type may exist and be in use at the same time in the database.

Each node is an instance of a database server typically running on its own host computer. A primary node, or coordinator 140, manages all global read-write transactions. Storage data is kept in main or permanent storage 170 which is shared between all nodes, and similarly, temporary data can be shared using shared temporary storage 180. The coordinator 140 further maintains a global catalog, storing information about DDL (data definition language) operations, in catalog store 142 as a master copy for catalog data. Changes in the global catalog are communicated from the coordinator 140 to other nodes 150 via a table version (TLV) log kept inside the shared main store through an asynchronous mechanism referred to herein as 'catalog replication'. In catalog replication, the coordinator 140 writes TLV log records which other nodes 150 read and replay to update their local catalog. With the asynchronous nature of catalog replication, when a transaction starts on secondary nodes 150, the transaction may wait for catalog replication to catch up to the latest database snapshot.

Thus, the one or more secondary nodes 150a, 150b, 150c, etc., each have their own catalog stores 152a, 152b, 152c, etc., configured locally to maintain their own local catalogs. The secondary nodes 150 may be designated as reader (read-only) nodes and writer (read-write) nodes, with one secondary node designated as a failover node to assume the coordinator role if the current coordinator 140 is unable to continue. All nodes are connected in a mesh configuration where each node is capable of executing remote procedure calls (RPCs) on other nodes. The nodes that participate in the cluster share messages and data via inter-node Communication (INC) 160, which provides a TCP/IP-based communication link between cluster nodes Each node has its own local transaction manager to handle transactions originating on that node. The transaction manager on the coordinator 140 acts as both local and global transaction manager. Clients may connect to any of the cluster nodes as individual servers, each being capable of running read only transaction on its own using its local transaction manager. For write transactions, secondary nodes 150 can run queries and update inside a write transaction, but only the global transaction manager on the coordinator 140 is allowed to start and finish the transaction (known as global transaction). Secondary nodes 150 internally request the coordinator 140 to begin and commit global transactions on their behalf. Committed changes from write transactions become visible to secondary nodes 150 via catalog replication.

For the MVCC process, each transaction on the coordinator 140 is assigned a unique id in the beginning (TID) as well as during commit (CID) using a global transaction counter. This applies to all transactions started on behalf of secondary nodes 150, as well. Further, each transaction in the database is assigned a global visibility number (VID) in the beginning based on the global transaction counter. Accordingly, the VID of a transaction Ti is set equal to the transaction identifier (TIDi) ($T_i$, $VID_i=TID_i$) for an active transaction. The secondary nodes 150 ensure that the version identifier ($VID_i$) is set equal to the latest committed identifier (CID) value on the coordinator 140 for an active transaction $T_i$. Further, an update under transaction $T_i$ creates a new object version with OVID=$TID_i$ and commits a new object version with OVID=$CID_i$, where OVID refers to object version identifier, as discussed further herein below.

The coordinator 140 also ensures that a new version created by transaction $T_i$ is not visible to other transactions until $T_i$ commits. In operation, a query selects the version created by the latest update in the same transaction, and if there are no earlier updates, then the query selects the latest committed version of object with respect to $VID_i$. Old committed versions are discarded by the coordinator 140 when there are no active transactions using them and no future transactions would use them across the cluster.

Figure 2:
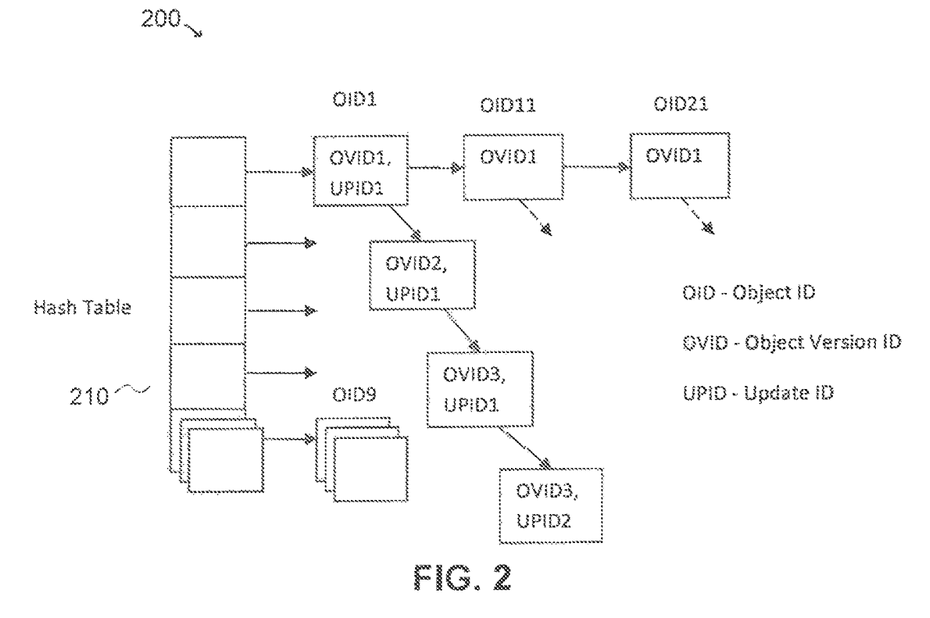
FIG. 2 illustrates a diagram of a database object catalog in accordance with embodiments of the invention.

FIG. 2 illustrates a diagram of a database object catalog 200 having each object version uniquely identified using a triplet of data in accordance with an embodiment of the invention, the triplet of data providing an object identifier (OID), an object version identifier (OVID), and an update identifier (UPID). The OID uniquely identifies an object across the cluster and is generated using a global counter maintained by the coordinator 140. When a database object (or simply referred to as an object with a unique OID) is updated under a transaction, a new version of the object, including the changes made to the object under the transaction, is created. Each unique new version is numbered using OVID and UPID. OVID is based on transaction VID, which is generated using the global transaction counter. The UPID is a unique update number within a transaction with respect to a given OVID and is generated by a per transaction counter, as is well appreciated by those skilled in the art. Object versions are kept in a hash table 210 using OID as the hash key value, which hashes to a two dimensional list of object versions, as is well understood in the art. The first dimension links object versions for objects having different OIDs. The second dimension links object versions with a same OID but different OVID and UPID.

Figure 3:
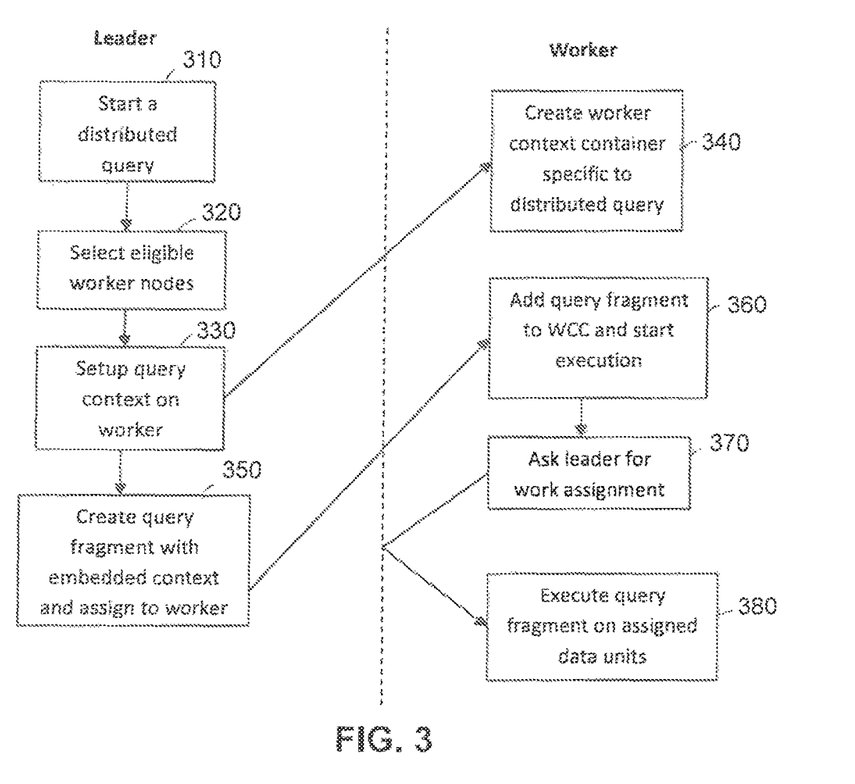
FIG. 3 illustrates a block diagram of an overall approach for distributed query execution in accordance with embodiments of the invention.

Referring now to FIG. 3, a block flow diagram illustrates an approach to support symmetric distributed query processing in a shared disk database cluster, where any node in the cluster can execute a distributed query. An originating node (leader) starts a distributed query (block 310) and selects a number of other nodes (workers) in the cluster based on certain eligibility criteria (block 320). For example, the criteria may include whether a node is up and running, whether the node is excluded, and the like. The leader node does the initial setup of the query context on all worker nodes (block 330). Workers create a worker context container (WCC) object for the distributed query (block 340). Then, the leader embeds required execution context for the distributed query inside a query fragment and passes the fragment information to the workers (block 350). The workers assign the fragment to their WCC and initiate query execution (block 360). As part of query execution, the workers ask the leader for a work assignment (block 370) and operate on assigned data units (block 380), with the leader node managing data unit assignment for all worker nodes.

In order to support snapshot isolation in the process represented by FIG. 3, leader and workers need to see the same database snapshot while executing their assigned query fragments. It is recognized that instance-specific MVCC rules cannot be relied upon to provide such support. For example, suppose a leader side transaction $T_i$ starts before distributed queries run. A worker transaction $T_j$ only becomes considered when the leader does the initial setup of a distributed query context on the worker. If the coordinator commits updates for objects involved in the distributed query between the time $T_i$ starts and $T_j$ gets considered, the leader and worker nodes will be looking at two different snapshots of the database, which violates the snapshot isolation property.

Alternatively, suppose a local transaction $T_i$ on the leader has done some update operations before executing the distributed query. These changes will only be visible inside $T_i$ unless $T_i$ commits. A distributed query running under $T_i$ on the leader will look at these update versions, but a worker transaction $T_j$ cannot see these update versions, which results in a violation of the snapshot isolation property.

In order to solve the above issues, in an embodiment, the leader node follows the same MVCC rules that a coordinator or a secondary node follows for non-distributed queries, as described herein above, while a new set of MVCC rules and transaction framework is followed by worker nodes while executing distributing query fragments. Included in the new set is a rule that a worker node only performs read only transactions and does not start any local transaction during initial setup of distributed query context from the leader node. Such transaction-less execution simplifies MVCC for workers and also avoids increased performance cost that would be needed for transaction maintenance. Further, for each object version accessed by a query, the leader node encodes a corresponding triplet of data into the distributed query fragment to be used by the workers to select a correct object version, either locally or from the leader node, as described further herein below.

Figure 4:
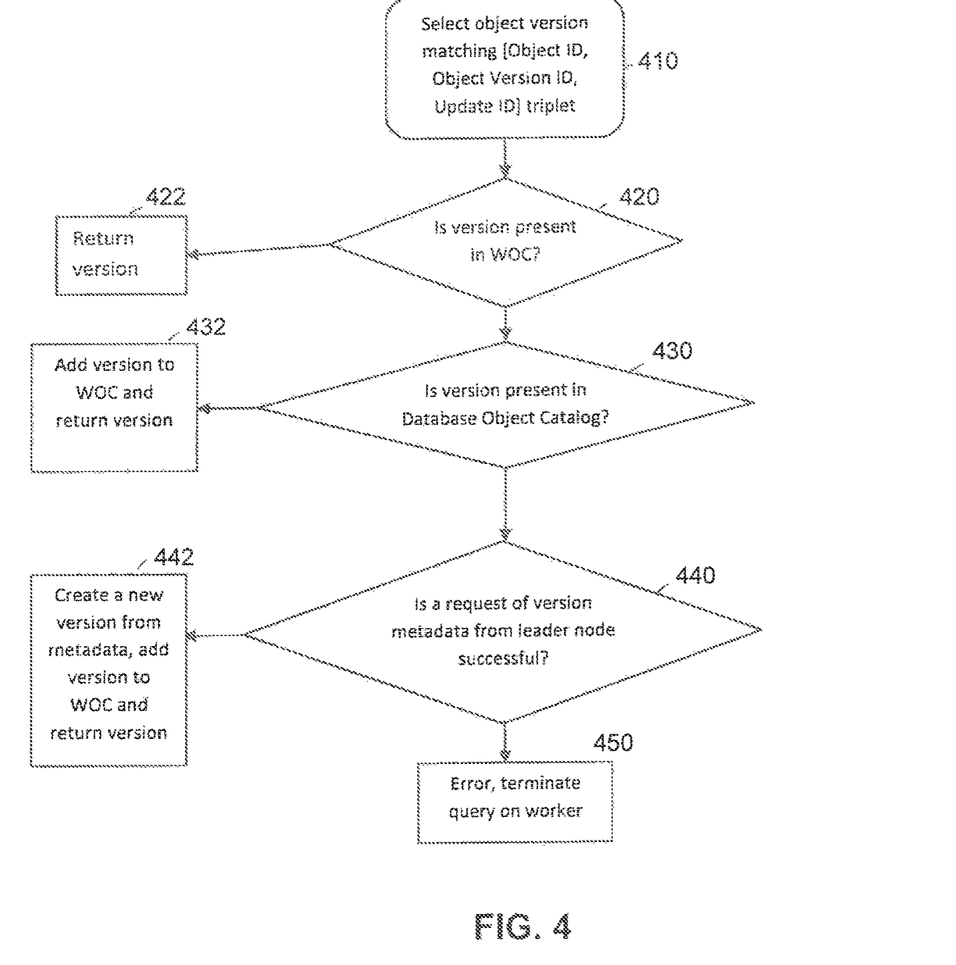
FIG. 4 illustrates a block flow diagram of object version selection on a worker node while executing a distributed query in accordance with embodiments of the invention.

Referring now to FIG. 4, a block flow diagram of object version selection on a worker node while executing a distributed query is illustrated in accordance with an embodiment of the invention. As shown in FIG. 4, a worker selects an object version using the triplet of data [OID, OVID, UID] embedded inside the query fragment by the leader (block 410), first looking for a local copy of the object version inside a worker object catalog, WOC (block 420). In the context of a leader node and worker nodes, the worker nodes maintain a query specific WOC inside the WCC to capture the corresponding snapshot state on the leader node for a distributed query. In an embodiment, the WOC is independent of the local transaction manager on the worker and is in an empty state when the WCC is first created, keeping a hash table of object versions in a format as done in the database object catalog.

If the WOC does have the version, it is returned (block 422). Without a matching version, the worker cheeks for the object version in the database object catalog (block 430). If a matching version is found, the worker node adds an entry of the object version to the WOC and returns the version (block 432).

If a matching version is not found, either the desired version is only visible to the leader transaction (i.e., a newer version is created on leader node) or it is not available yet given the asynchronous nature of the catalog replication. The worker node requests the object version metadata from the leader node on the network using the [OID, OID, UID] triplet (block 440) and creates a local copy of object version to add to the WOC if the request is successful (block 442).

When the required object version is not received, the workers terminate their part of query (block 450). This may occur, for example, when the leader completes the query using local resources for the worker nodes that do not provide results within a specified timeout period. The termination by the workers avoids having lagging workers continue to try to do distributed query work which is no longer required.

With the embodiments of the invention, in comparison to localized queries, which are confined to a single node, the only added overhead is version metadata transmission between the worker and leader nodes. Thus, the overhead is quite low and is readily compensated as a result of reduced complexity and contention by having the WOC maintained independently from the local and global transaction managers.

Further, workers need not wait for catalog replication to catch up to the snapshot state on the leader side before starting distributed query work. Also, leaders do not need to transmit all the required version metadata in advance, which reduces transmission costs. Instead, workers can request version metadata on demand, and workers can find a required object version in the local catalog or request it from the leader if not available in the local catalog.

In addition, no enhancements are required at the transaction manager level, so there is no added performance overhead to it, and no added complexity or performance overhead to the database system.

Figure 5:
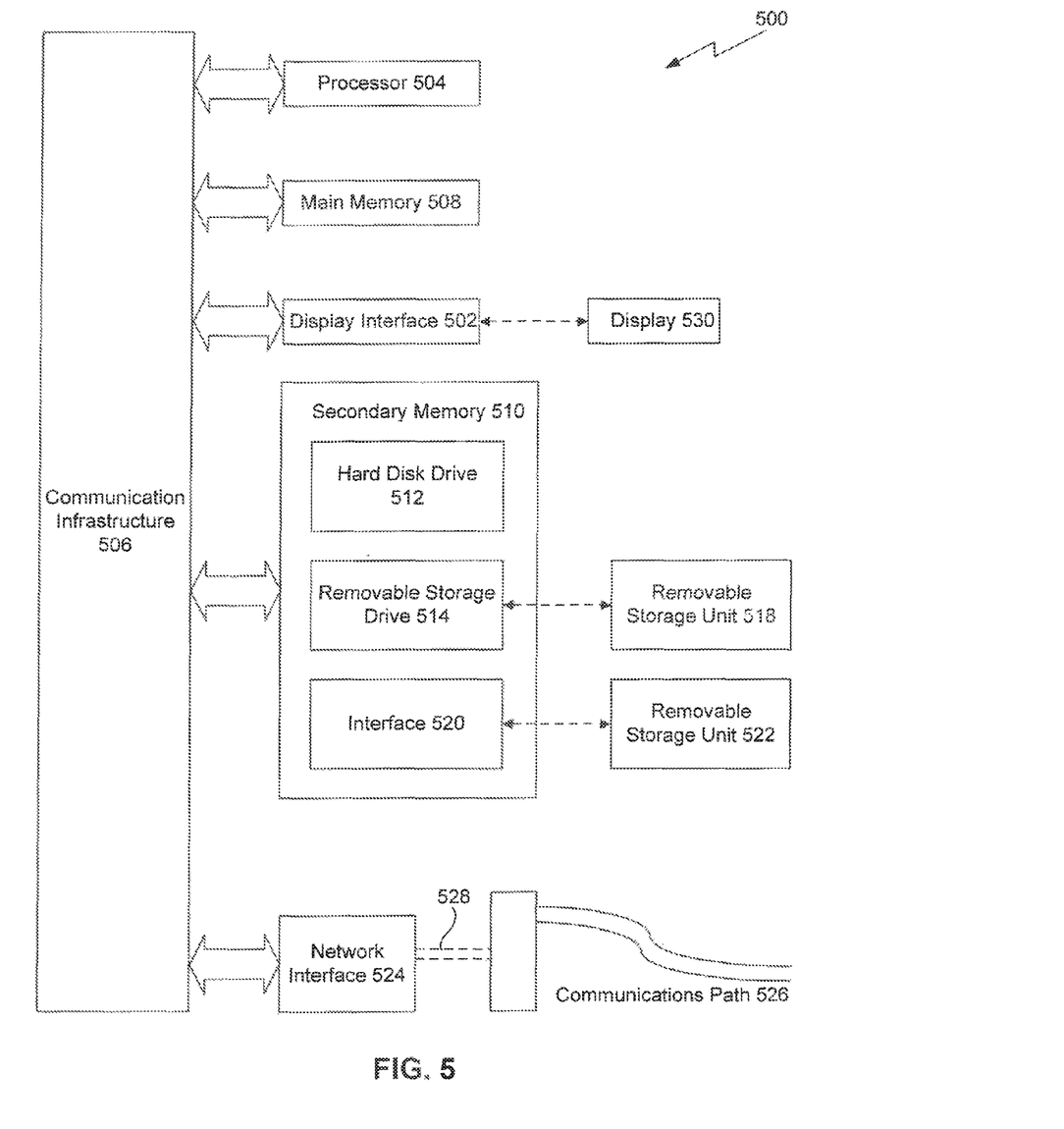
FIG. 5 illustrates an example computer useful for implementing components of embodiments of the invention.

Various aspects of the present invention can be implemented by software, firmware, hardware, or a combination thereof. FIG. 5 illustrates an example computer system 500, such as capable of acting as the nodes in the cluster of FIG. 1, in which the present invention, or portions thereof, can be implemented as computer-readable code. For example, the methods illustrated by flowchart of FIGS. 2 and 4 can be implemented in system 500. Various embodiments of the invention are described in terms of this example computer system 500. After reading this description, it will become apparent to a person skilled in the relevant art how to implement the invention using other computer systems and/or computer architectures.

Computer system 500 includes one or more processors, such as processor 504. Processor 504 can be a special purpose or a general purpose processor. Processor 504 is connected to a communication infrastructure 506 (for example, a bus or network).

Computer system 500 also includes a main memory 508, preferably random access memory (RAM), and may also include a secondary memory 510. Secondary memory 510 may include, for example, a hard disk drive 512, a removable storage drive 514, and/or a memory stick. Removable storage drive 514 may comprise a floppy disk drive, a magnetic tape drive, an optical disk drive, a flash memory, or the like. The removable storage drive 514 reads from and/or writes to a removable storage unit 518 in a well known manner. Removable storage unit 518 may comprise a floppy disk, magnetic tape, optical disk, etc. which is read by and written to by removable storage drive 514. As will be appreciated by persons skilled in the relevant art(s), removable storage unit 518 includes a computer usable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 52.2 and interfaces 520 which allow software and data to be transferred from the removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 are in the form of signals which may be electronic, electromagnetic, optical, or other signals capable of being received by communications interface 524. These signals are provided to communications interface 524 via a communications path 526. Communications path 526 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 518, removable storage unit 522, and a hard disk installed in hard disk drive 512. Signals carried over communications path 526 can also embody the logic described herein. Computer program medium and computer usable medium can also refer to memories, such as main memory 508 and secondary memory 510, which can be memory semiconductors (e.g. DRAMs, etc.). These computer program products are means for providing software to computer system 500.

Computer programs (also called computer control logic) are stored in main memory 508 and/or secondary memory 510. Computer programs may also be received via communications interface 524. Such computer programs, when executed, enable computer system 500 to implement the present invention as discussed herein. In particular, the computer programs, when executed, enable processor 504 to implement the processes of the present invention, such as the method illustrated by the flowchart of FIGS. 2 and 4. Accordingly, such computer programs represent controllers of the computer system 500. Where the invention is implemented using software, the software may be stored in a computer program product and loaded into computer system 500 using removable storage drive 514, interface 520, hard drive 512 or communications interface 524.

The invention is also directed to computer program products comprising software stored on any computer-useable medium. Such software, when executed in one or more data processing device, causes a data processing device(s) to operate as described herein. Embodiments of the invention employ any computer-useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

While the invention is described in some detail with specific reference to a preferred embodiment and certain alternatives, there is no intent to limit the invention to that particular embodiment or those specific alternatives. Further, the description presents methods that may be implemented using processor-executable instructions, for directing operation of a device under processor control. The processor-executable instructions may be stored on a computer-readable medium, such as CD, DVD, flash memory, or the like. The processor-executable instructions may also be stored as a set of downloadable processor-executable instructions, for example, for downloading and installation from an Internet location (e.g., Web server). Those skilled in the art will appreciate that modifications may be made to the preferred embodiment without departing from the teachings of the present invention.

What is claimed is:

1. A method for snapshot isolation support for distributed query processing in a shared disk database cluster, the method comprising:
   forming object identification data in a leader node of query execution in a shared disk database cluster;
   distributing at least one fragment of the query execution to at least one worker node in the shared disk database cluster; and
   utilizing the object identification data for multiversion concurrency control during query execution by the leader node and at least one worker node, wherein the object identification data includes an object identifier, an object version identifier, and an update identifier, and wherein the update identifier is an unique update number within a transaction corresponding to the object version identifier.

2. The method of claim 1, wherein utilizing further comprises utilizing the object identification data to select an object version for the at least one fragment.

3. The method of claim 2, wherein selecting an object version further comprises selecting a version based on at least one of a worker object catalog, a database object catalog, and a leader node version.

4. The method of claim 3, wherein the worker object catalog and database object catalog include hash tables based on the object identification data.

5. The method of claim 3, further comprising requesting version metadata of the leader node version when the version is not available locally in the worker object catalog or in the database object catalog.

6. The method of claim 1, further comprising performing the utilizing with no worker transactional overhead.

7. A shared disk database cluster (SDC) system with snapshot isolation support for distributed query processing comprising:
   shared-disk storage; and
   a plurality of data processing nodes coupled to the shared disk storage and including a leader node of query execution that forms object identification data and distributes at least one fragment of the query execution to at least one worker node, the object identification data utilized for multiversion concurrency control during query execution by the leader node and at least one worker node, wherein the object identification data includes an object identifier, an object version identifier, and an update identifier, and wherein the update identifier is an unique update number within a transaction corresponding to the object version identifier.

8. The system of claim 7, wherein the object identification data is utilized to select an object version for the at least one fragment.

9. The system of claim 8, wherein an object version further comprises a version based on at least one of a worker object catalog, a database object catalog, and a leader node version.

10. The system of claim 9, wherein the worker object catalog and database object catalog include hash tables based on the object identification data.

11. The system of claim 9, wherein a worker node requests version metadata of the leader node version when the version is not available locally in the worker object catalog or in the database object catalog.

12. The system of claim 7, wherein the multiversion concurrency control during query execution occurs with no worker transactional overhead.

13. A non-transitory computer-usable medium having instructions recorded thereon that, if executed by a computing device, cause the computing device to perform a method comprising:
   forming object identification data in a leader node of query execution in a shared disk database cluster;
   distributing at least one fragment of the query execution to at least one worker node in the shared disk database cluster; and
   utilizing the object identification data for multiversion concurrency control during query execution by the leader node and at least one worker node for snapshot isolation support in the shared disk database cluster, wherein the object identification data includes an object identifier, an object version identifier, and an update identifier, and wherein the update identifier is an unique update number within a transaction corresponding to the object version identifier.

14. The non-transitory computer-usable medium of claim 13, wherein the instructions for utilizing further comprise utilizing the object identification data to select an object version for the at least one fragment.

15. The non-transitory computer-usable medium of claim 14, wherein selecting an object version further comprises selecting a version based on at least one of a worker object catalog, a database object catalog, and a leader node version.

16. The non-transitory computer-usable medium of claim 15, wherein the instructions further comprise requesting version metadata of the leader node version when the version is not available locally in the worker object catalog or in the database object catalog.

17. The non-transitory computer-usable medium of claim 13, wherein the instructions further comprise performing the utilizing with no worker transactional overhead.

* * * * *